United States Patent [19]
Koyama

[11] Patent Number: 5,606,350
[45] Date of Patent: Feb. 25, 1997

[54] INK JET RECORDING APPARATUS OPERATIVE TO PROVIDE QUALITY PRINTING ON HYDROPHILIC AND HYDROPHOBIC RECORDING MEDIA

[75] Inventor: Toshio Koyama, Kanagawa, Japan

[73] Assignee: Fuji Xerox Co., Ltd., Tokyo, Japan

[21] Appl. No.: 544,756

[22] Filed: Oct. 18, 1995

Related U.S. Application Data

[63] Continuation of Ser. No. 82,973, Jun. 29, 1993, abandoned.

[30] Foreign Application Priority Data

Jun. 30, 1992 [JP] Japan ................................. 4-196063

[51] Int. Cl.$^6$ ................................................ B41J 2/01
[52] U.S. Cl. .............................. 347/14; 347/37; 347/101
[58] Field of Search ................................. 347/14, 37, 40, 347/43, 101, 102, 105

[56] References Cited

U.S. PATENT DOCUMENTS

| | | | |
|---|---|---|---|
| 4,614,967 | 9/1986 | Sayanagis | 346/140 PD |
| 4,617,580 | 10/1986 | Miyakawa | 347/14 |
| 4,965,593 | 10/1990 | Hickman | 346/140 PD |

FOREIGN PATENT DOCUMENTS

| | | | |
|---|---|---|---|
| 488724 | 6/1992 | European Pat. Off. | 347/43 |
| 2401111 | 7/1974 | Germany | 347/14 |
| 2-4523 | 1/1990 | Japan . | |
| 43578 | 2/1990 | Japan . | |
| 179749 | 7/1990 | Japan . | |
| 189159 | 8/1991 | Japan . | |
| 63-312155 | 6/1992 | Japan . | |

*Primary Examiner*—N. Le
*Attorney, Agent, or Firm*—Finnegan, Henderson, Farabow, Garrett & Dunner, L.L.P.

[57] ABSTRACT

When a light-transmitting recording medium mode has been selected, the speed of a head carriage 3 is slowed down from a normal print mode speed. Printing is controlled so as to match the moving speed of the head carriage 3 so that the print resolution remains unvaried, and such control signal is sent to a plurality of record heads 6 carried on the head carriage 3. A single line of recording is made on a light-transmitting recording medium by a single round of scanning, in which the plurality of record heads 6 jet respective color inks on the light-transmitting recording medium so that dots of desired colors can be superposed one upon the other substantially completely.

3 Claims, 2 Drawing Sheets

FIG. 2(A)  FIG. 2(B)  FIG. 2(C)  FIG. 2(D)
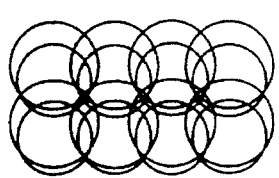
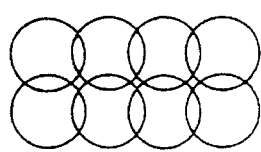
FIG. 3(A) PRIOR ART  FIG. 3(B) PRIOR ART  FIG. 3(C) PRIOR ART  FIG. 3(D) PRIOR ART

INK JET RECORDING APPARATUS OPERATIVE TO PROVIDE QUALITY PRINTING ON HYDROPHILIC AND HYDROPHOBIC RECORDING MEDIA

This application is a continuation of application Ser. No. 08/082,973, filed Jun. 29, 1993, now abandoned.

BACKGROUND OF THE INVENTION

The invention relates to ink jet recording apparatuses. More particularly, it is directed to an ink jet recording apparatus capable of forming high-quality images even on hydrophobic or less hydrophilic recording media, such as light-transmitting recording media used for originals of overhead projectors (OHP).

A variety of ink jet recording apparatuses that make a recording by jetting ink droplets on a recording medium have heretofore been developed. Among them is a color ink jet recording apparatus that has a plurality of heads and jets a plurality of color inks from such heads to produce color images.

Along with the development of recording apparatuses grows a demand for diversification of recording media to be used therefor. In addition to conventionally used printing paper that is highly hydrophilic, paper such as light-transmitting recording media for use in OHP originals should also be included. In this case, hydrophobic light-transmitting recording media having been subjected to such a treatment by which the media can accept ink will be used.

It is high speed recording that must be achieved by recording apparatuses. As the recording speed of the ink jet recording apparatuses is increased, improper superposition or misalignment of dots is caused and thus their recording quality becomes impaired. To overcome this shortcoming, the conventional ink jet recording apparatuses record at such a highest possible speed as can confine the improper superposition or misalignment to a degree not objectionable to users.

The users are not aware of the improper superposition or misalignment of dots caused by a recording at such recording speed when a normal recording medium is used. However, such defect becomes distinct when a hydrophobic light-transmitting recording medium is used.

To overcome this problem, a recording apparatus is disclosed in, e.g., Japanese Patent Unexamined Publication No. 312155/1988. This recording apparatus scans twice to form dots on a light-transmitting recording medium by overlapping one dot upon another or by filling up the space between dots. As a result of this method, a high-density image free from blots can be produced.

Also proposed in Japanese Patent Unexamined Publication No. 4523/1990 is a recording apparatus that repeats the printing of a single line of data per color as many as a number of colors to be used to make a single line of multi-color recording. As a result of this method, blots in printed dots can be reduced.

These conventional recording apparatuses require a plurality of rounds of scanning to print a single line of data. This is not only time-consuming but also impairs printing quality due to improper superposition of dots caused during the plurality of rounds of scanning.

FIGS. 3 (A) to (D) are diagrams illustrative of prints produced by the conventional recording methods. FIG. 3 (A) shows arrays of dots printed by a first round of scanning; FIG. 3 (B) shows arrays of dots at the time of superposing a plurality of colors by first and second rounds of scanning; FIG. 3 (C) is a horizontal sectional view of FIG. 2 (B); and FIG. 3 (D) shows an array of dots at the time of printing a thin line. The printing method involving a plurality of rounds of scanning is liable to cause improper superposition of dots as shown in FIG. 3 (B). When the dots are printed while improperly superposed, the section of such printing exhibits, as shown in FIG. 3 (C), incomplete superposition of colors, thus causing color unmatching in the direction in which the dots are improperly superposed. In the case of printing thin lines, high-speed printing tends to cause turbulence in jetting ink. Less hydrophilic recording media such as hydrophobic light-transmitting recording media is liable to misalignment of dots, which results in inconsistent image quality such as shown in FIG. 3 (D).

SUMMARY OF THE INVENTION

The invention has been made in view of the above circumstances. Accordingly, the object of the invention is to provide an ink jet recording apparatus capable of producing high-quality and high-definition images without impairing the printing quality of thin lines even if the images are recorded on hydrophobic light-transmitting recording media.

To achieve the above object, the invention is applied to an ink jet recording apparatus that includes: a recording means having a plurality of heads for recording by jetting ink droplets on a recording medium in accordance with recording information; a moving means for moving the recording means and the recording medium relative to each other in two directions orthogonal to each other. In such an ink jet recording apparatus, a selector means for selecting a recording mode from a light-transmitting recording medium mode and another recording medium mode and a control means for effecting a recording whose print speed is slower than in a normal recording when the light-transmitting recording medium mode has been selected by the selector means are provided so that improper superposition of dots recorded by the ink droplets having been jetted out of the heads can be reduced.

The plurality of color inks to be jetted from the plurality of heads include, e.g., cyan, magenta, yellow and black, and a multi-color image is thus recorded by forming, e.g., red, green, blue and black, etc. by a subtractive color process.

The invention is characterized as including a print mode for a light-transmitting recording medium such as an OHP original. The feature of this mode is to effect scanning at a speed slower than that in the normal print mode and to record a plurality of colors in a single round of scanning. This allows meandering of thin lines to be better controlled than the recording methods involving a plurality of rounds of scanning to print a single line of data. As a result, a high-definition image with better-aligned dots can be produced at a high speed.

BRIEF DESCRIPTION OF THE DRAWINGS

FIGS. 2 (A) to (D) are diagrams illustrative of dot patterns printed when a light-transmitting medium print mode has been selected; and FIGS. 3 (A) to (D) are diagrams illustrative of printing according to a conventional recording method.

DETAILED DESCRIPTION OF THE PREFERRED EMBODIMENTS

Figure 1:
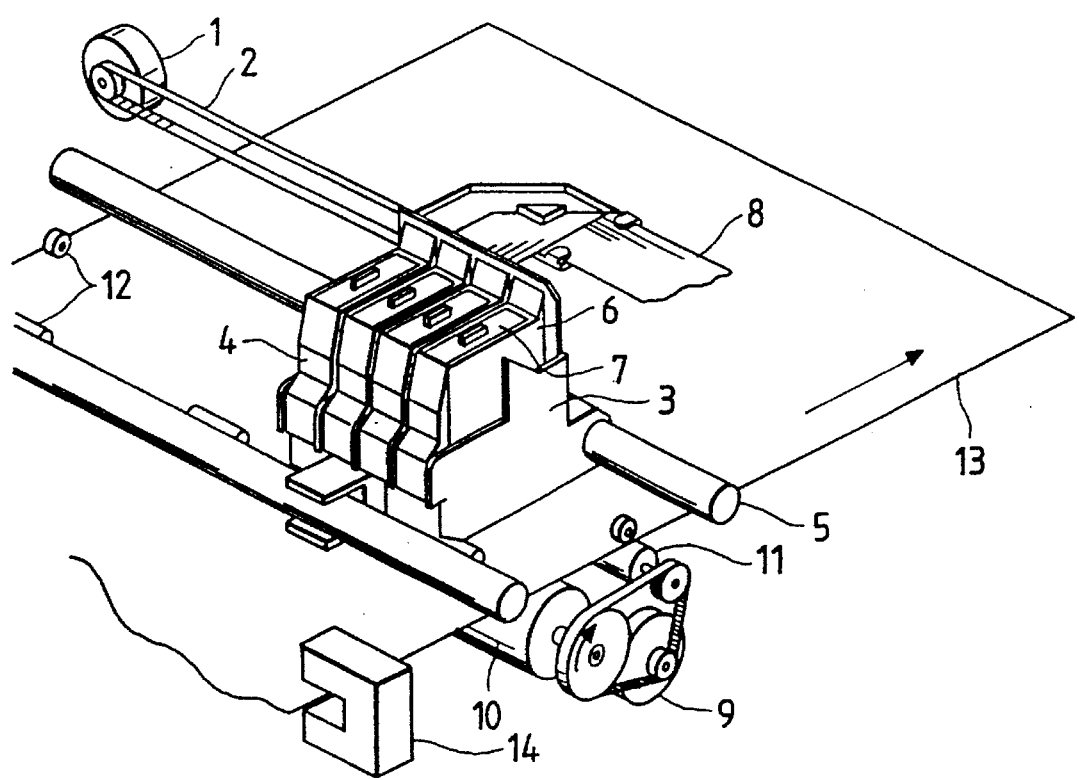
FIG. 1 is a diagram schematically showing a construction of an ink jet recording apparatus, which is an embodiment of the invention.

FIG. 1 is a diagram schematically showing a construction of an ink jet recording apparatus, which is an embodiment of the invention. In FIG. 1, reference numeral 1 designates a drive motor; 2, a timing belt; 3, a head carriage; 4, a lock lever; 5, a guide; 6, a record head; 7, ink tanks; 8, a power signal cable; 9, a sheet feed motor; 10, a feed roller; 11, an exit roll; 12, a pinch roll; and 13, a record sheet.

The drive motor 1 causes the head carriage 3 to move through the timing belt 2 to thereby supply motive power for scanning. The timing belt 2 transmits the motive power of the drive motor 1 to the head carriage 3 by connecting the drive motor 1 to the head carriage 3, so that the head carriage 3 moves along the guide 5 for scanning.

A plurality of record heads 6 are mounted on the head carriage 3. These record heads are fixed by the lock lever 4. The lock lever 4 positions and fixes each record head 6 carried on the head carriage 3. The guide 5 regulates the direction in which the head carriage 3 moves.

Each record head 6 records data on the record sheet 13 by jetting ink droplets thereon. The record sheet 13 receives the ink droplets jetted from the record heads. The inks to be jetted out of the heads 6 are supplied from the ink tanks 7 mounted on the record heads 6. The power signal cable 8 for transmitting head drive signals is connected to the record heads 6, so that the record heads can perform the ink droplet jetting operation according to the head drive signals. Further, the plurality of record heads 6 are fixed on the head carriage 3 and move along the guide 5 integrally with the head carriage 3. The plurality of record heads 6 mounted on the head carriage 3 are designed to jet a plurality of color inks so that color printing can be implemented. The colors of ink include, e.g., cyan, magenta, yellow and black. If these colors are to be used, it is preferable to arrange the record heads so that the printed dots are superposed in the order of black, cyan, magenta and yellow. The ink tank 7 is carried on each record head 6 and supplies the recording ink to the corresponding record head. The power signal cable 8 supplies print data, a control signal and the like from a not shown controller to the record heads 6.

Motive power from the sheet feed motor 9 is transmitted to the feed roll 10 and the exit roll 11 so that the record sheet 13 is moved in the direction orthogonal to the carriage moving direction while nipping the record sheet 13 together with the pinch roll 12.

In FIG. 1, reference numeral 14 designates a photointerrupter act as a sheet distinguishing sensor of a selector means. A light of the photointerrupter 14 is interrupted when the normal record sheet 13 is conveyed into the photointerrupter, thereby the normal print mode is selected by the selector means through the detection of the photointerrupter. On the other hand, a light of the photointerrupter 14 is not interrupted when the light-transmitting recording medium is conveyed into the photointerrupter, thereby the light-transmitting record medium mode is selected by the selector means through the detection of the photointerrupter.

However, a recording mode selection switch may be further provided on a control panel of the controller in such a manner that the selection of the modes can be directly conducted by the user.

An operation of the recording apparatus of the invention will be described.

An operation in a normal print mode will be described first. A print mode is selected by the selector means. The record sheet 13 is nipped between the feed roll 10 and the pinch roll 12, both driven by the sheet feed motor 9, and fed from the front and left to the rear and right as viewed in FIG. 1. The record sheet 13 is further forwarded in a sheet discharge direction while nipped between the exit roll 11 and the pinch roll 12, similarly driven by the sheet feed motor 9, until the record sheet 13 reaches a predetermined print position. The head carriage 3 carrying the record heads 6 moves along the guide 5 from left to right as viewed in FIG. 1 while driven by the drive motor 1. Each record head 6 jets the ink supplied from the corresponding ink tank 7 on the record sheet 13 in the form of droplets based on the print data signal and control signal, etc. sent via the power signal cable 8, so that a single line of data is recorded on the record sheet 13. A single line of recording is made with the respective inks being jetted from the corresponding record heads 6 carried on the head carriage 3 during a single scanning operation.

Upon completion of a single line of recording, the sheet feed motor 9 is driven to forward the record sheet 13 by a single line or a predetermined distance by the feed roll 10, the exit roll 11 and the pinch roll 12. As the record sheet 13 is being forwarded, the head carriage 3 is returned leftward as viewed in FIG. 1 to start recording of a next single line in the case of unidirectional printing. In the case of bidirectional printing, the record head is either stopped or moved so as to be positioned at the rightmost end of the print area of a next line while the record sheet 13 is being forwarded. The next line is printed by causing the head carriage 3 to move from left to right as viewed in FIG. 1. When a single page of recording has been completed by repeating such printing operation for a single line, the sheet feed motor 9 is driven to discharge the record sheet 13 by the feed roll 10, the exit roll 11 and the pinch roll 12.

An operation in a light-transmitting record medium print mode will be described next. When the light-transmitting record medium print mode has been selected by the selector means 14, the drive motor 1 speed is reduced to a value smaller than that in the normal print mode to slow down the movement of the head carriage 3. Then, printing is controlled so as to match the head carriage 3 moving speed lest the print resolution should vary, and the control signals are sent to the record heads 6 through the power signal cable 8. The operation of feeding, forwarding and discharging the light-transmitting record medium is the same as in the normal print mode. The head carriage 3 scanning operation is the same except that such operation is performed at a slower speed. The colors used to be printed by the plurality of record heads 6 carried on the head carriage 3 are, e.g., cyan, magenta, yellow and black. Recording on the light-transmitting recording medium with these colors leads to the formation of, e.g., green, blue and red the like by the subtractive color process, thus making multi-color recording possible. Of course, inks of other colors, e.g., red, green and blue can be used.

FIGS. 2 (A) to (D) are diagrams illustrative of dot patterns printed when the light-transmitting recording medium print mode has been selected. FIG. 2 (A) shows dot arrays printed by a single record head; FIG. 2 (B) shows dot arrays at the time a plurality of colors are superposed by two record heads; FIG. 2 (C) is a horizontal sectional view of FIG. 2 (B); and FIG. 2 (D) shows a dot array at the time a thin line is printed.

As described above, the invention is characterized as printing by superposing dots one upon another while jetting ink droplets from a plurality of record heads 6 in a single round of scanning. Therefore, as shown in FIGS. 2 (B) and (C), the ink droplets jetted out of the two record heads 6 can be superposed substantially completely. The advantage of the invention over the conventional printing method involving repeated scanning whose output is as shown in FIGS. 3 (B) and (C) is a reduction in improper superposition of dots. The slow print speed in the light-transmitting recording medium print mode contributes to preventing inconsistent and turbulent jetting of ink. Thus, as shown in FIG. 2 (D), a neatly aligned dots can be produced in the case of printing thin lines.

While a record mode is selected by a manual switch in this embodiment, such selection may be made automatically by detecting the type of record medium. Automatic detection of the light-transmitting medium can be achieved easily by measuring the transmittance thereof while irradiating a light beam thereto.

The timing of driving each record head may be set by the record mode, since the amount of unmatching between the nozzle position at the print start timing and the ink droplet adhering position differs depending on the record speed. Particularly, in the case of bidirectional printing, any improper ink droplet adhering position imposes the problem. It may be of benefit to set the drive timing properly in the light-transmitting recording medium print mode lest ink droplets should adhere at improper positions. It may be arranged so that improper adhesion of ink droplets in the normal recording mode is accepted.

As is apparent from the foregoing pages, the invention is characterized as not only making the print speed slower than the normal print speed in the case of printing on hydrophobic light-transmitting recording media in order to prevent turbulence in the jetting of ink, but also printing by only a single round of scanning. These features of the invention contributes to preventing improper superposition of dots from occurring, thereby allowing high-quality images to be obtained.

What is claimed is:

1. An ink jet recording apparatus comprising:

a plurality of heads for recording by jetting ink droplets a recording medium in accordance with recording information;

moving means for moving the heads relative to the recording medium in a first scan for a first line of printing in a first direction while jetting the ink droplets, and stopping jetting of the ink droplets as the first scan is ended and moving the recording medium relative to the heads in a second direction orthogonal to the first direction for another scan and another line of printing;

selecting means for selecting a recording mode from a light-transmitting recording medium mode and another recording medium mode; and control means for causing the heads to move relative to the recording medium in the first direction more slowly in the light-transmitting recording medium mode than in the another recording mode, thereby reducing improper superposition of the dots recorded by the ink droplets.

2. An ink jet recording apparatus according to claim 1, wherein a multi-color image corresponding to input image information is formed on the recording medium by a subtractive color process while using a plurality of color inks and jetting such plurality of color inks from the plurality of heads.

3. An ink jet recording apparatus according to claim 2, wherein the plurality of color inks to be jetted from the plurality of heads are cyan, magenta, yellow and black.

* * * * *

UNITED STATES PATENT AND TRADEMARK OFFICE
CERTIFICATE OF CORRECTION

PATENT NO. : 5,606,350
DATED : February 25, 1997
INVENTOR(S) : Toshio KOYAMA

It is certified that error appears in the above-indentified patent and that said Letters Patent is hereby corrected as shown below:

Claim 1, column 6, line 5, after "droplets",
insert --on--.

Signed and Sealed this

Seventh Day of October, 1997

*Attest:*

BRUCE LEHMAN

*Attesting Officer*   *Commissioner of Patents and Trademarks*